(12) United States Patent
Schmitz

(10) Patent No.: US 8,690,453 B2
(45) Date of Patent: Apr. 8, 2014

(54) PLUG/SOCKET ARRANGEMENT

(75) Inventor: Guenter Schmitz, Jesteburg (DE)

(73) Assignee: Airbus Operations GmbH, Hamburg (DE)

( * ) Notice: Subject to any disclaimer, the term of this patent is extended or adjusted under 35 U.S.C. 154(b) by 526 days.

(21) Appl. No.: 13/008,585

(22) Filed: Jan. 18, 2011

(65) Prior Publication Data

US 2011/0176773 A1 Jul. 21, 2011

Related U.S. Application Data

(60) Provisional application No. 61/296,228, filed on Jan. 19, 2010, provisional application No. 61/307,561, filed on Feb. 24, 2010.

(30) Foreign Application Priority Data

Jan. 19, 2010 (DE) .......................... 10 2010 001 010
Feb. 24, 2010 (DE) .......................... 10 2010 002 303

(51) Int. Cl.
    *G02B 6/36* (2006.01)
(52) U.S. Cl.
    USPC .......................................................... 385/53
(58) Field of Classification Search
    USPC .......................................................... 385/53
    See application file for complete search history.

(56) References Cited

U.S. PATENT DOCUMENTS 5,577,146 A * 11/1996 Musk ............................... 385/92
5,682,450 A * 10/1997 Patterson et al. ............... 385/65
6,570,768 B2 * 5/2003 Medina .......................... 361/747

FOREIGN PATENT DOCUMENTS

DE    3700513 C2    7/1988
DE    4035096 C2    11/1991

OTHER PUBLICATIONS

German Office Action for DE 10 2010 002 303.5 dated Sep. 22, 2010.

* cited by examiner

*Primary Examiner* — Uyen Chau N Le
*Assistant Examiner* — Hoang Tran
(74) *Attorney, Agent, or Firm* — Jenkins, Wilson, Taylor & Hunt, P.A.

(57) ABSTRACT

The present invention relates to a plug/socket arrangement, in particular an electrical and/or optical plug/socket arrangement of an aircraft or spacecraft, which comprises a housing and at least one insert which can be received in the housing. It further comprises a releasable connection means which is adjustable between a locked position, in which the insert and the housing are locked to one another, and an unlocked position, in which the insert and the housing are not locked to one another; and an adjustment member which is adjustable between an inoperative position, in which the adjustment member is not operatively connected to the connection means, and a release position, in which the adjustment member is operatively connected to the connection means for releasing the locked position into the unlocked position of the connection means.

8 Claims, 15 Drawing Sheets

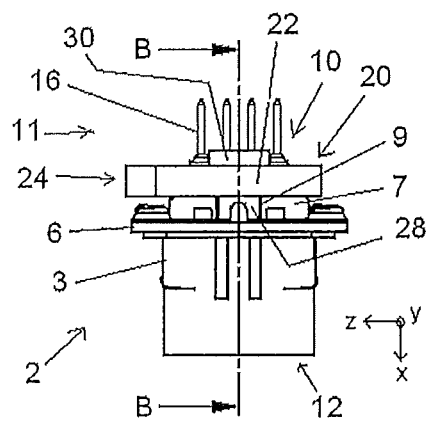
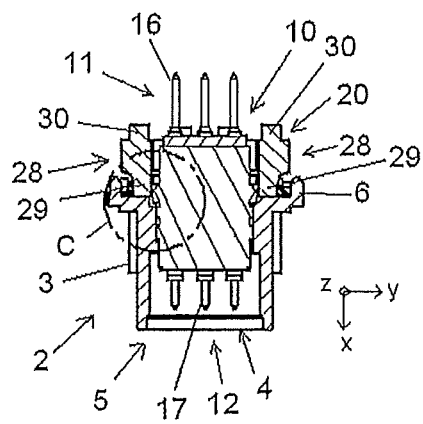
Fig. 8a        Fig. 8b
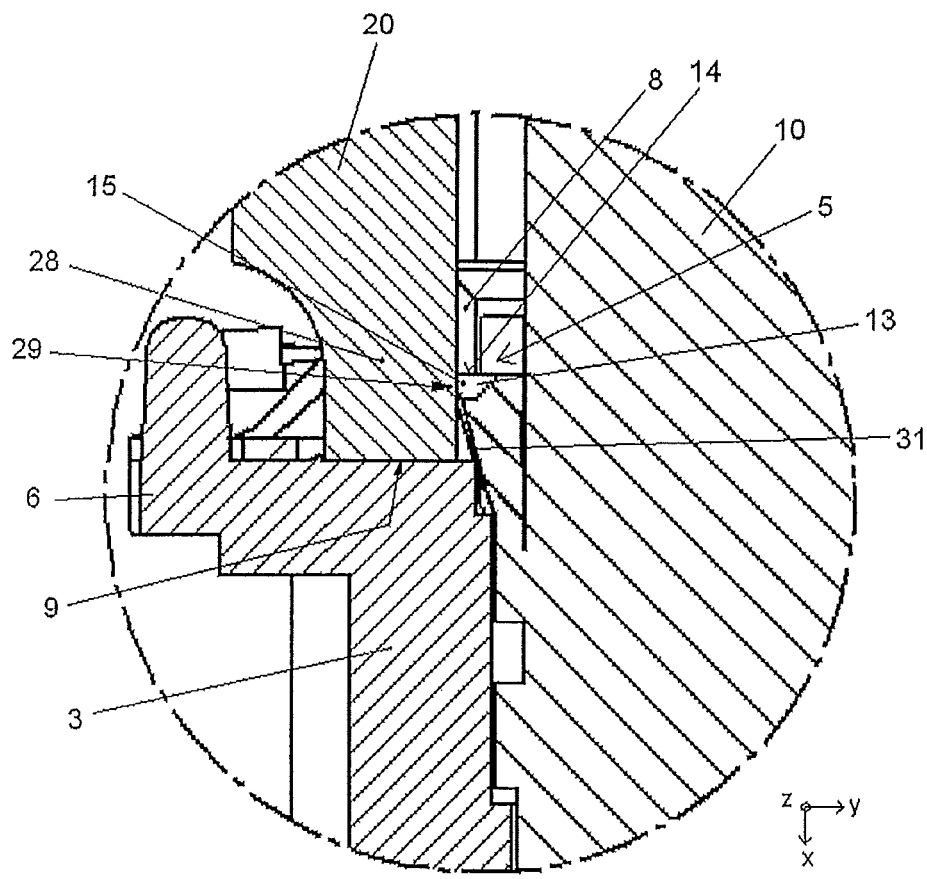
Fig. 8c

PLUG/SOCKET ARRANGEMENT

CROSS-REFERENCE TO RELATED APPLICATIONS

This application claims priority to U.S. Provisional Application No. 61/296,228 filed Jan. 19, 2010; German Application No. 10 2010 001 010.3 filed Jan. 19, 2010; U.S. Provisional Application No. 61/307,561 filed Feb. 24, 2010; and German Application No. 10 2010 002 303.5 filed Feb. 24, 2010, the entire disclosures of which are herein incorporated by reference.

FIELD OF THE INVENTION

The present invention relates to a plug/socket arrangement, in particular to an electrical or optical plug connector of an aircraft or spacecraft, and a plug/socket arrangement of this type comprising an unlocking tool.

Plug connectors are used, for example, for separating and connecting electrical or optical lines. Fluid lines can also be provided with plug connectors. They conventionally consist of two parts which are referred to as a coupler (female) and a plug (male). Combinations of female and male types in one part are also possible. One of these parts can be connected, for example, to a cable, the other of these parts being mounted, for example, on a circuit board, on a housing, a wall, a plate or the like, or being connected to a further cable. Further combinations are also conceivable.

In the present case, the term plug/socket arrangement is to be understood to mean one of the two parts of a plug connection.

Although it can be applied to plug/socket arrangements of plug connectors of any desired size and type, the present invention and the problem on which it is based are described below with reference to plug/socket arrangements of plug connectors of the SAC (subminiature aircraft connector) type, for example plug connectors of an aircraft.

FIG. 1 is a schematic perspective view of an embodiment of an electrical device 1 comprising four plug/socket arrangements 2 of the conventional before assembly.

The electrical device (not shown in greater detail in FIG. 1) comprises a wall portion 19, for example a cover plate, on which four housings 3 of the plug/socket arrangements 2 with flanges 6 are fastened by means of screws. Portions not shown in FIG. 1 (see for example FIG. 3a) of the underside of the housings 3 extend through the wall portion 19. Each housing 3 comprises a continuous opening 4, into which an insert 10 can be introduced or inserted in each case.

In this case, the inserts 10 associated with the plug/socket arrangements 2 are mounted on a circuit board 18 to which they are fastened in an upright manner by means of their terminal sides 11, the fastening involving for example terminal members 16 (see FIG. 3b) being soldered to conductor tracks of the circuit board 18. Each of the terminal members 16 extends upwards in the x-direction through the insert 10 from the terminal side 11 to a connector side 12. In this case, the connector side 12 is equipped with plug sockets (not shown) for coupling to plugs (also not shown) to form a complete plug connector. The inserts 10 also comprise latching projections 13 in the lower third of the sides thereof, which latching projections correspond to corresponding latching portions in the openings 4 of the housings 3.

These inserts 10 are provided for insertion into the housings 3. In this example, the wall portion 19 comprising the housings 3 is placed onto the inserts 10 arranged on the circuit board 18 in the opposite x-direction, in such a way that each insert 10 is introduced into an associated housing 3. The assembled state is illustrated in FIG. 2.

The inserts 10 introduced into the housings 3 of the plug/socket arrangements 2 are accordingly arranged in the openings 4 with their connector sides 12 at a short distance from the upper edges of the housings 3. In this state, the inserts 10 and the housings 3 are connected via a latching of the latching projections 13 to the corresponding latching portions, in a way that prevents the inserts 10 from being pulled out of the housings 3 and the housings 3 from being removed from the inserts 10 in the x-direction.

For maintenance purposes and during replacement and repair procedures, it is necessary to disassemble these plug/socket arrangements 2. The connection means 5 must be released for this purpose. In the case of a circuit board assembly, as shown here, it is not possible to release the latching or connection of the housing 3 and insert 10 using the tools supplied by the manufacturers of the plug/socket arrangements, made for example of a bent sheet metal part. Indeed, using these tools it is only possible to remove the insert 10 from the housing 3 from the rear in the axial direction (x-direction) if there is free space for disassembly there. If the plug/socket arrangements are assembled on a circuit board 18 at a distance from the circuit board 18 that is too small, disassembly is not possible. Using conventional tools, such as screwdrivers and/or pliers, these latching means are also inaccessible from the underside. If there is a high constructional density of plug/socket arrangements and further components, disassembly cannot take place in the case of maintenance and repair procedures, and so the associated device can longer be used.

SUMMARY OF THE INVENTION

Against this background, the object of the present invention is to provide an improved plug/socket arrangement.

A further object is to provide an improved plug/socket arrangement comprising an associated unlocking tool.

According to the invention, these objects are achieved by a plug/socket arrangement having the features of claims 1 and 4.

Accordingly, a plug/socket arrangement, in particular of an electrical and/or optical plug connector of an aircraft or spacecraft, is provided. It comprises a housing and at least one insert which can be received in the housing. It further comprises a releasable connection means which is adjustable between a locked position, in which the insert and the housing are locked to one another, and an unlocked position, in which the insert and the housing are not locked to one another; and an adjustment member which is adjustable between an inoperative position, in which the adjustment member is not operatively connected to the connection means, and a release position, in which the adjustment member is operatively connected to the connection means for releasing the locked position into the unlocked position of the connection means.

Compared to the approaches mentioned at the outset the present invention therefore has the advantage that a conventional tool is not required for releasing the locking means, thus making a particularly compact construction possible. The plug/socket arrangement according to the invention is particularly suitable for circuit board assemblies having a small construction.

It is particularly advantageous that the plug/socket arrangements in devices can be released and reassembled in a simple manner for maintenance and repairs, in such a way that devices fitted therewith can be repaired and reused. In addition, assembly times are advantageously reduced.

Advantageous configurations and improvements of the present invention can be found in the subclaims.

A basic idea of the invention is to equip the plug/socket arrangement with an adjustment member which is adjustable between an inoperative position, in which the adjustment member is not operatively connected to the connection means, and a release position, in which the adjustment member is operatively connected to the connection means for releasing the locked position into the unlocked position of the connection means.

It is provided that the adjustment member can be mounted or is rigidly mounted on a portion of the insert and/or a portion of the housing, at least one pressure portion of the adjustment member being provided for cooperation with the connection means. This makes it possible to integrate the adjustment member into the plug/socket arrangement in such a way that an assembly surface which is used by the plug/socket arrangement is not enlarged or is only negligibly enlarged.

The adjustment member is formed as a clamp having at least one pressure projection comprising the at least one pressure portion, the adjustment member comprising two actuation portions which are spaced apart by a gap when the adjustment member is in the inoperative position, the actuation portions resting against one another and the gap being closed when the adjustment member is in the release position. Conventional tools such as pliers and screwdrivers can therefore be used for actuating the adjustment member. Special tools are not required.

The adjustment member comprises a base portion and two side portions, each of the side portions being mounted by a first end on opposing ends of the base portion, at least one side portion comprising the at least one pressure projection having the at least one pressure portion, and one of the two actuation portions being arranged on each of the second ends of the side portions. A one-piece construction of this type makes simple installation possible. In addition, the two side portions can be connected to the base portion via resilient transition portions, which results in an easy, automatic return movement into the inoperative position.

A preferred configuration provides that the housing is provided with at least one recess in which the at least on pressure projection of the adjustment member can be received. The adjustment member can therefore be assembled and received in a simple manner. The at least one recess can be made in the housing later on, for example by corresponding machining. For mass production, all that is necessary is a simple modification to existing injection-moulding tools. It is not necessary to redesign a tool of this type.

The adjustment member can be formed such that it can be locked in the release position by a locking means. This facilitates disassembly, since the actuation tool need only be applied briefly, the adjusted state, namely the inoperative position or the release position, then being maintained without further actuation. To this end, the locking means can comprise a clamp mechanism which is integrated into the actuation portions. Naturally, other locking mechanisms are also possible.

In a further preferred configuration, the adjustment member comprises foot portions as spacers. In the case of a circuit board assembly, for example, a particular distance between the plug/socket arrangement and the circuit board is necessary for various reasons. A spacer plate is conventionally used for this purpose. By dint of using the adjustment member having integrated foot portions with a spacer function, these known additional spacers are no longer necessary. The number of parts and the assembly time are reduced.

The connection means can comprise at least one latching portion on the housing, which latching portion is provided for cooperation with at least one latching projection on the insert. Previously existing connection means can therefore be used.

It is particularly advantageous if the at least one latching projection of the adjustment member is provided with the at least one pressure portion for contacting the at least one latching projection of the connection means. Existing configurations can therefore be used with only minor modifications.

An alternative plug/socket arrangement, in particular of an electrical or optical plug connector of an aircraft or spacecraft, comprises:
a housing; at least one insert which can be received in the housing; a releasable connection means which is adjustable between a locked position, in which the insert and the housing are locked to one another, and an unlocked position, in which the insert and the housing are not locked to one another; a circuit board on which the insert is mounted; and an unlocking tool comprising at least one unlocking bracket which can be brought into contact with the connection means and which is adjustable between an inoperative position, in which the unlocking bracket is not operatively connected to the connection means, and a release position, in which the unlocking bracket is operatively connected to the connection means for releasing the locked position into the unlocked position of the connection means.

A complete device comprising the plug/socket arrangement can be unlocked using an unlocking tool of this type in one operation. This makes a considerable economy of time possible.

The connection means comprises at least one latching portion on the housing, which latching portion is provided for cooperation with at least one latching projection on the insert.

An unlocking tool of this type comprises:
at least one base plate comprising at least one unlocking bracket; a holding frame comprising at least two levers; and at least one pressure bar for cooperation with the levers and the at least one insert via the circuit board. The device comprising the circuit board is mounted on the unlocking brackets of the unlocking tool, the pressure bar is pushed under the levers via the circuit board and inserts and housings are released from one another in one operation by moving the two levers.

In this case, the at least one unlocking bracket comprises two legs each having at least one projection, each of the projections being integrally formed on the upper ends of the legs and being formed with opposing oblique projection portions. The legs can be guided through apertures of the circuit board and brought directly into contact with the latching projections of the inserts.

An above-described unlocking tool is provided for the above-described plug/socket arrangement.

In the following, the invention will be described in detail on the basis of embodiments with reference to the accompanying figures of the drawings, in which:

BRIEF DESCRIPTION OF THE DRAWINGS

In the figures:

FIG. 4 is a perspective view of the terminal side of the insert of FIG. 3b inserted into the housing of FIG. 3a;

FIG. 8a is a schematic side view of the plug/socket arrangement according to the invention;

FIG. 8b is a schematic sectional view along the line B-B according to FIG. 8a;

FIG. 8c is an enlarged view of region C from FIG. 8b;

FIG. 8d is a schematic top view of the underside of the plug/socket arrangement according to the invention of FIG. 8a;

DESCRIPTION OF EXEMPLARY EMBODIMENTS

Figure 1:
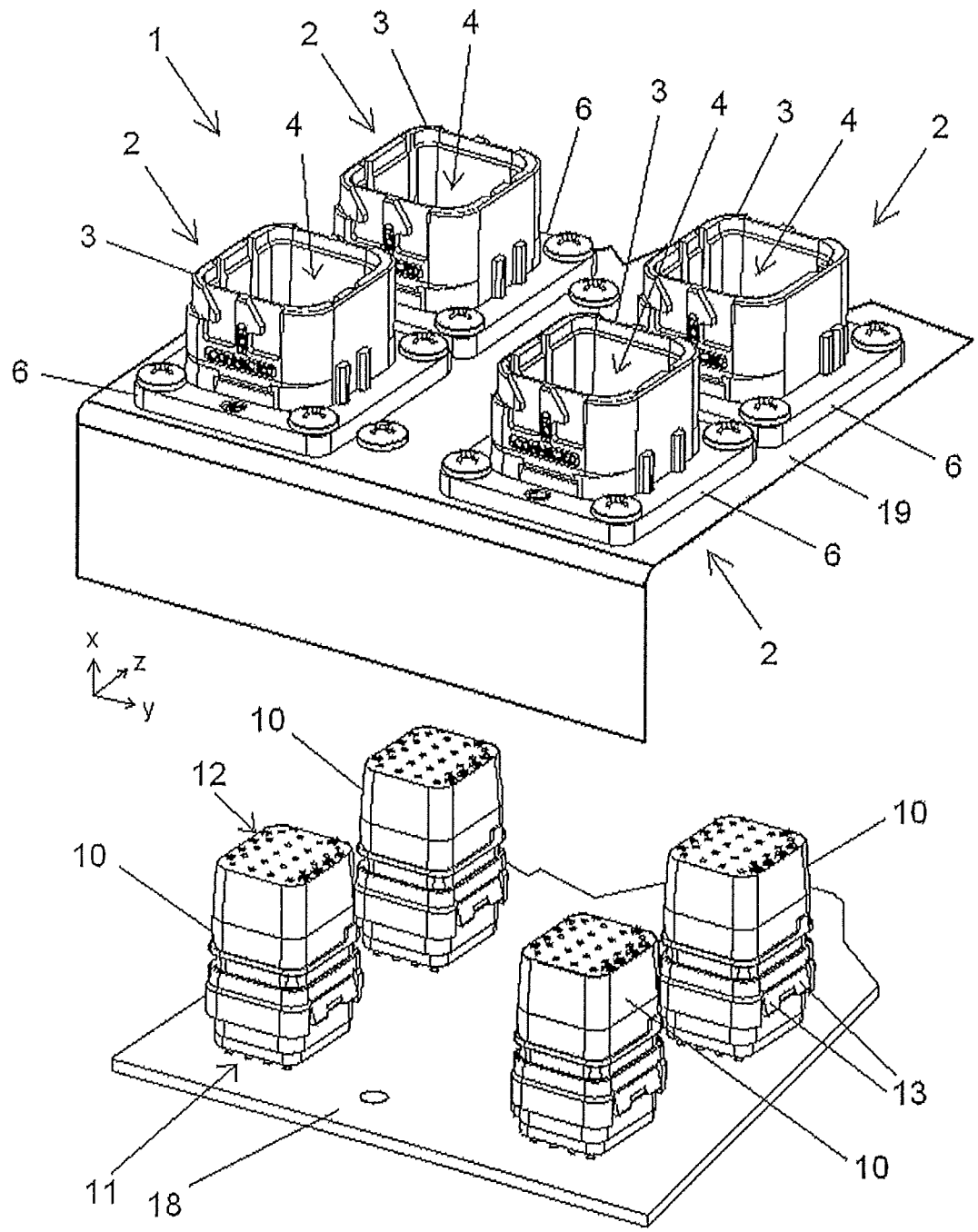
FIG. 1 is a schematic perspective partial view of a conventional electrical device before assembly using plug/socket arrangements.

In the figures, like reference numerals denote like or functionally equivalent components, unless indicated otherwise. Coordinates x, y and z are shown to facilitate orientation.

Figure 2:
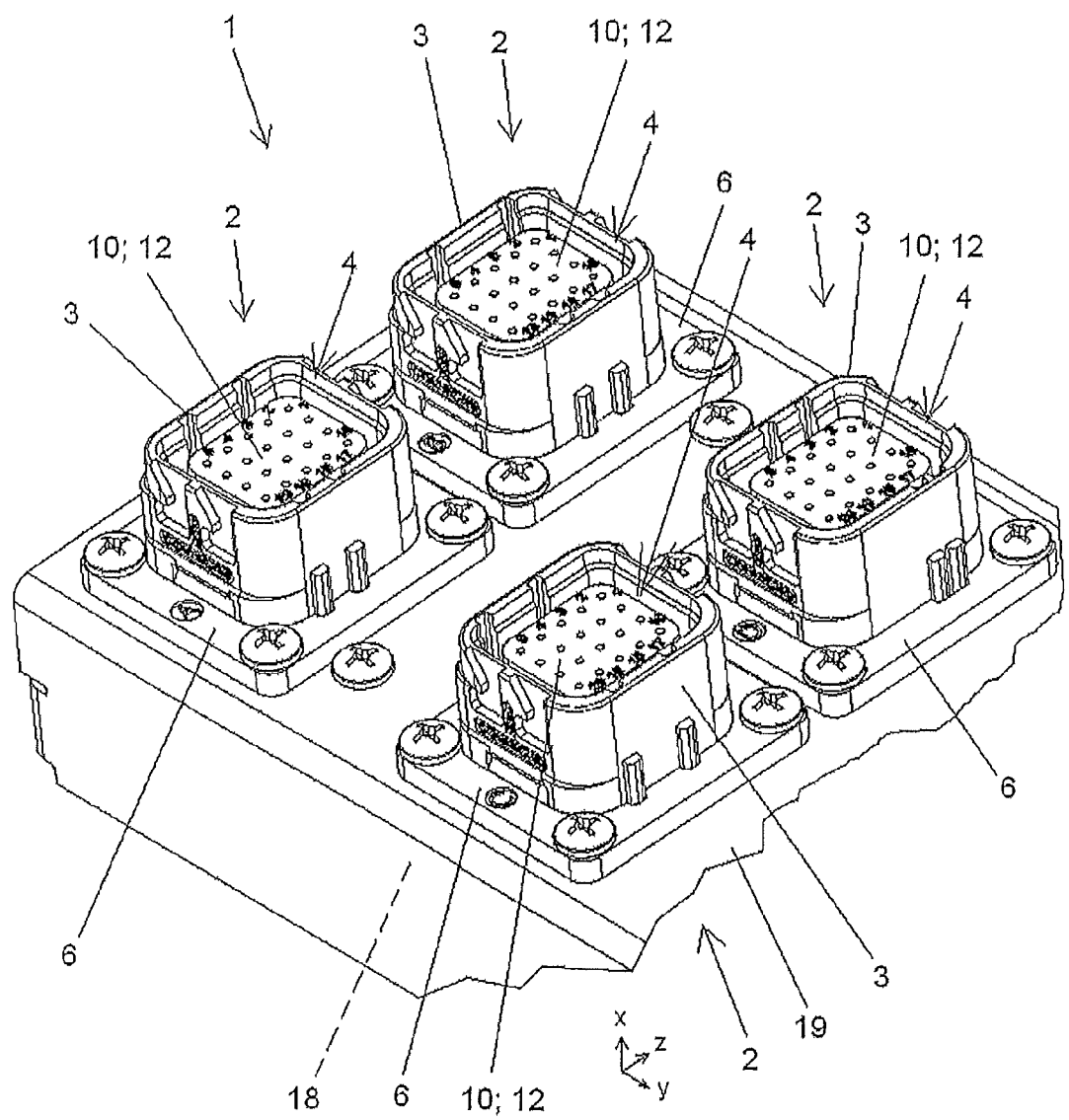
FIG. 2 shows the device of FIG. 1 when assembled.

FIGS. 1 and 2 have already been described above.

Figure 3A:
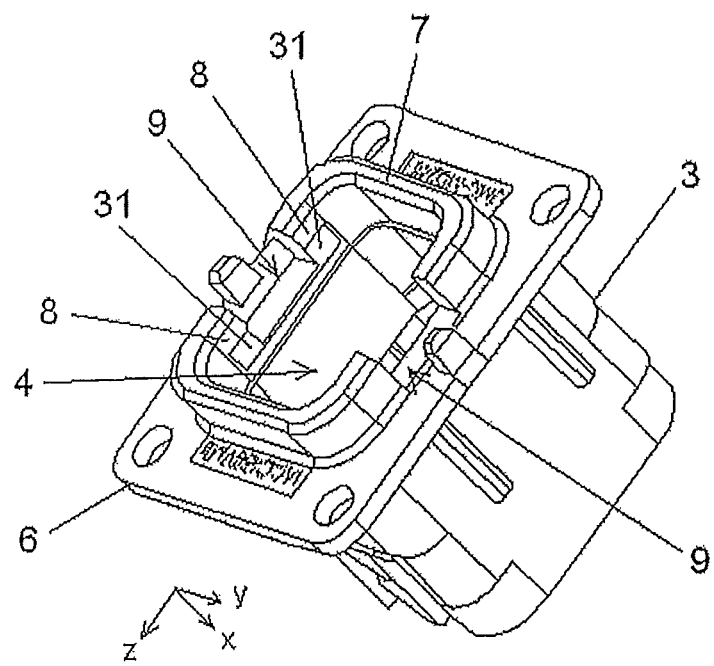
FIG. 3a is a perspective view of an embodiment of a housing of a plug/socket arrangement according to the invention showing a terminal side.
Figure 3B:
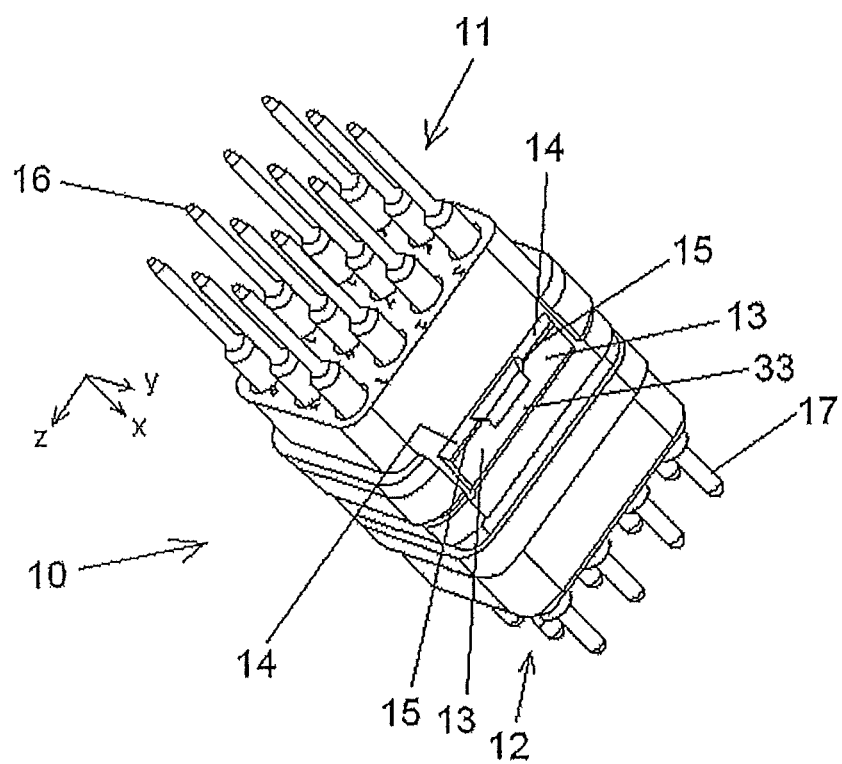
FIG. 3b is a perspective view of an insert of the plug/socket arrangement according to the invention showing a terminal side.

FIG. 3a is a perspective view of an embodiment of a housing 3 of a plug/socket arrangement 2 according to the invention showing the underside of the housing 3. FIG. 3b is a perspective view of an insert 10 of the plug/socket arrangement 2 according to the invention showing a terminal side 11.

In the lower portion, shown at the top in FIG. 3a, of the housing 3, the housing 3 is provided with a peripheral flange 6. On this flange 6, the housing 3 extends through the flange 6 in the opposite x-direction in the form of a collar 7, the course of which is interrupted by two opposing recesses 9. In this example, these recesses 9 extend in the x-direction up to the flange 6 (the underside in this case).

The housing 3 comprises a continuous opening 4 in which the insert 10 can be received in the longitudinal direction of the housing 3 (x-direction). In the case of an insert 10 which, for example, is already mounted on a circuit board 18 (see FIGS. 1 and 2), the housing 3 is pushed onto the insert 10.

Latching seats 31, which extend from the opening 4 in the y-direction, are integrally formed in the housing wall below the collar 7 in the region of the flange 6 and on either side of the recesses 9 in each case. In this case, only the latching seats 31 on the left-hand side are shown, latching seats 31 also being provided on the opposite side, as can easily be imagined but is not absolutely necessary. Each of the latching seats 31 is limited in the opposite x-direction by latching portions 8 and comprises bevelled surfaces in the other x-direction. The latching seats 31 correspond to latching projections 13 of the insert 10.

The insert 10 shown in FIG. 3b comprises a body with contacts guided through it which form terminal members 16 of a terminal side 11 in the underside, which is shown at the top in this case. On the opposite side (the side facing downwards in FIG. 3b) these contacts form, together with connector members 17 (not described in greater detail), a connector side 12 of the insert 10. The cross-section of the body of the insert 10 in the y-z plane corresponds to the cross-section of the opening 4 of the housing 3 of the plug/socket arrangement 2.

A latching projection portion 33, which is resilient in the y-direction and extends in the z-direction, is integrally formed on the longitudinal side of the insert 10 shown here. In this example, a latching projection portion 33 of this type is also arranged on the opposite side (not shown), as can easily be imagined. On the ends thereof, this latching projection portion 33 comprises latching projections 13 which in this case are separated from one another in the z-direction in the upper half of the latching projection portion 33. Each latching projection 13 has a projecting edge comprising a contact portion 15. A holding portion 14 is arranged above this in each case. In this example, each latching projection 13 further has a substantially triangular cross-section in the x-y plane.

When the insert 10 is introduced, connector side 12 first, into the opening 4 of the housing 3 (or vice versa), each of the latching projections 13 latches into the latching seats 31 of the housing 3. The holding portions 14 of the latching projections 13 engage with the undersides of the latching portions 8. The insert 10 is therefore connected to the housing 3 in a way that prevents the insert 10 from being pulled out in the opposite x-direction (or the insertion direction) and the housing 3 from being removed in the x-direction.

Figure 4:
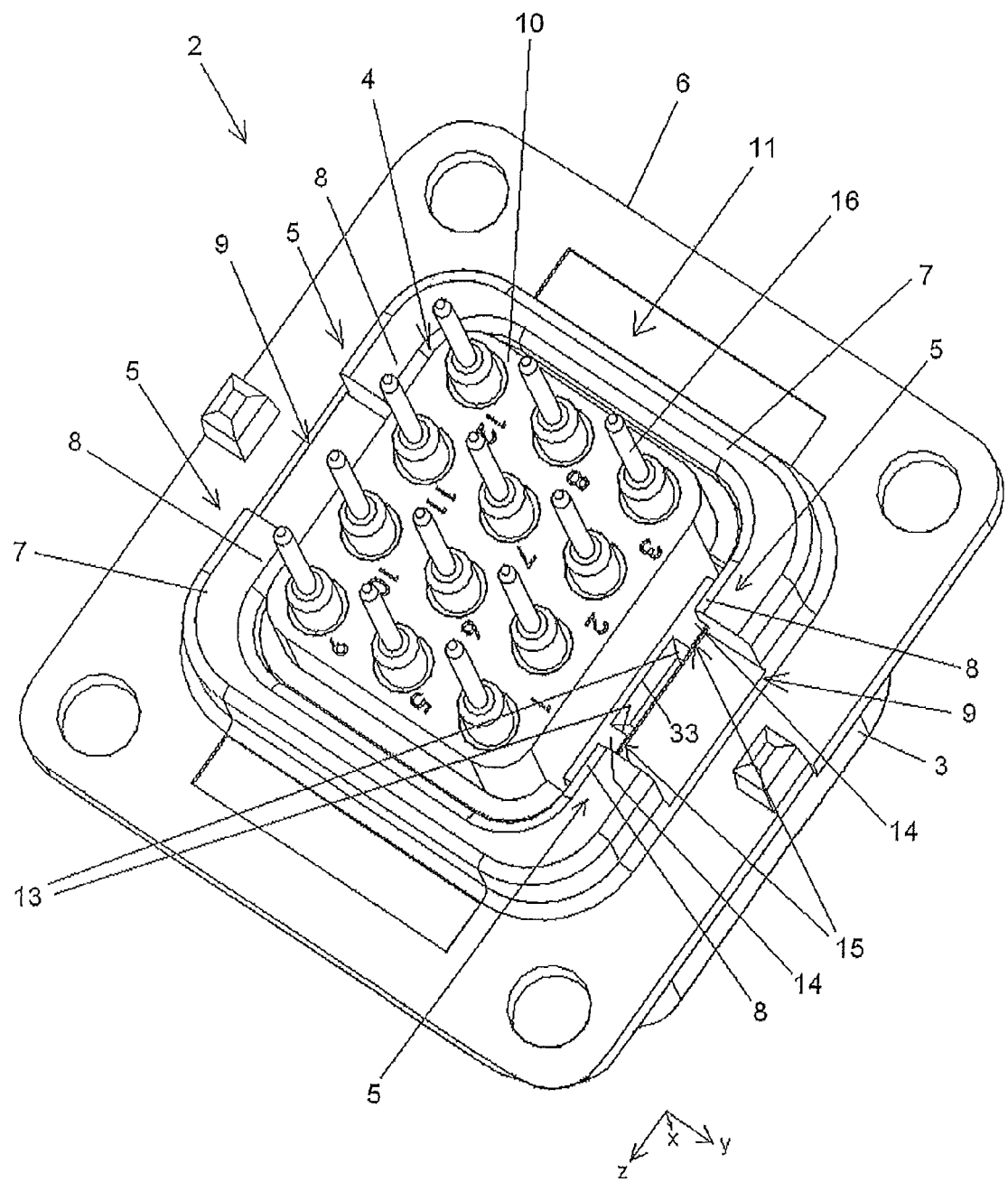

In this regard, FIG. 4 is a perspective view of the terminal side 11 of the insert 10 of FIG. 3b inserted into the housing 3 of FIG. 3a.

In this case, it is clear that approximately half of each latching projection 13 in the longitudinal direction thereof (z-direction) is located with its holding portion 14 below the associated latching portion 8 of the housing 3. The contact portions 15 of those portions of the latching projections 13 which are not located below the latching portions 8 project into the regions of the recesses 9 in each case.

In this case, the latching projections 13 of the insert 10 and the latching portions 8, comprising the latching seats 31, of the housing form a connection means 5 on each opposing side. A reverse arrangement is also conceivable.

Figure 5:
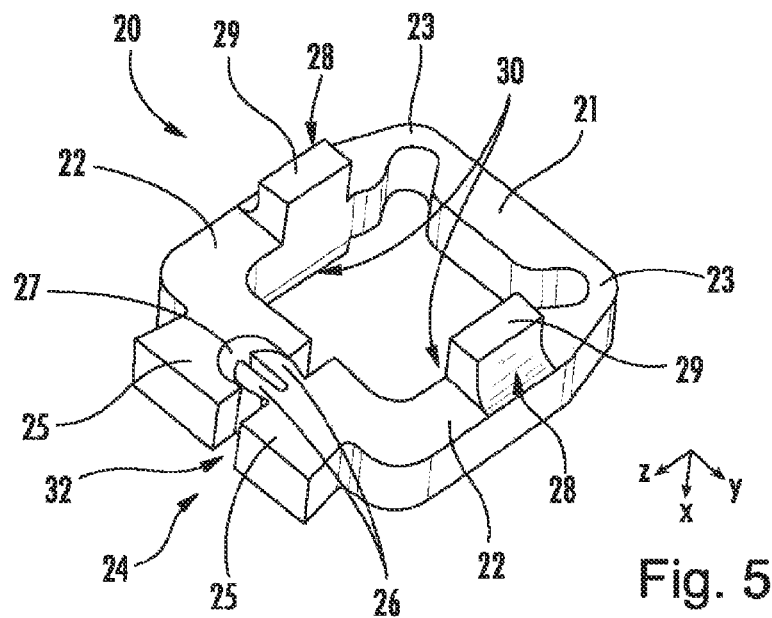
FIG. 5 is a schematic perspective view of an adjustment member according to the invention.

Owing to the recesses 9 integrally formed in the collar 7, the latching projections 13 can be reached in the y-direction and actuated via their contact portions 15 by an adjustment member 20, which is shown in a schematic perspective illustration in FIG. 5.

The adjustment member 20 shown in FIG. 5 is provided for arrangement on the collar 7 of the housing 3. This is shown in a perspective view in FIG. 6.

In this example, the adjustment member 20 is formed as a clamp. It comprises a base portion 21 and two side portions 22. The side portions 22 are each mounted by a first end on opposing ends of the base portion 21 via a transition portion 23. In this case, each side portion 22 is provided with a pressure projection 28, each of which comprises a pressure portion 29. The pressure projections 28 are arranged approximately in the central region of the side portions 22. An actuation portion 25 is arranged on each of the second ends of the side portions 22. The actuation portions 25 are spaced apart by a gap 32. They are part of a locking means 24, which in this case comprises two engagement members 26 and an engagement seat 27. Viewed from above, the engagement members 26 each have a semicircular cross-section and are separated by a slot. In this case, they are mounted on the right-hand actuation member 25 in the region of the gap 32 and project into the engagement seat 27 which is integrally formed in the opposite actuation portion 25 and has a shape that corresponds to the engagement members 26.

Figure 6:
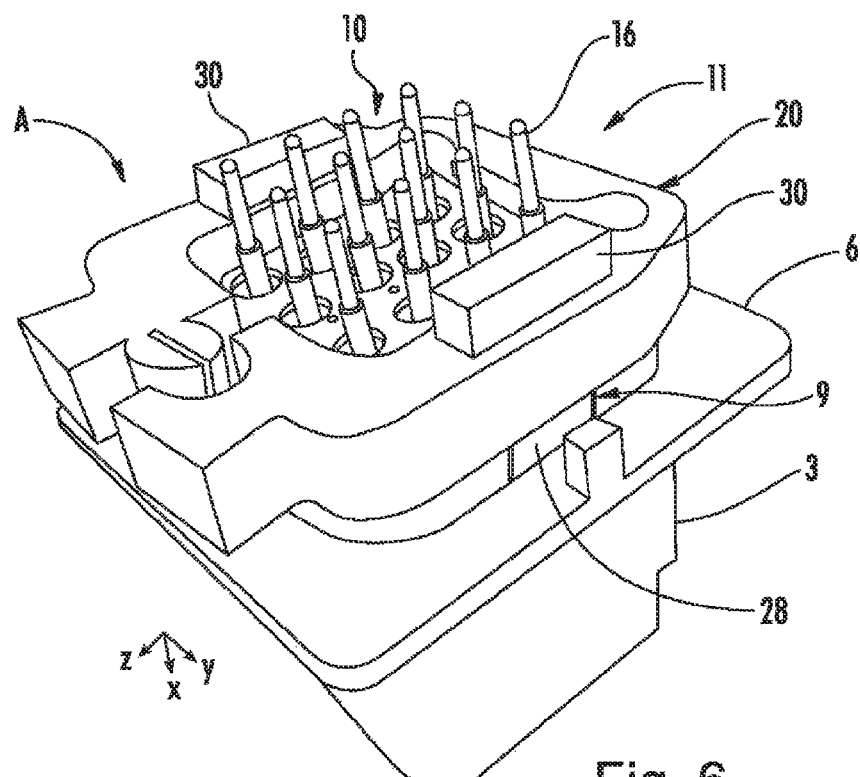
FIG. 6 is a perspective view of the terminal side of the plug/socket arrangement according to the invention of FIG. 4 with the adjustment member of FIG. 5 mounted thereon.
Figure 7:
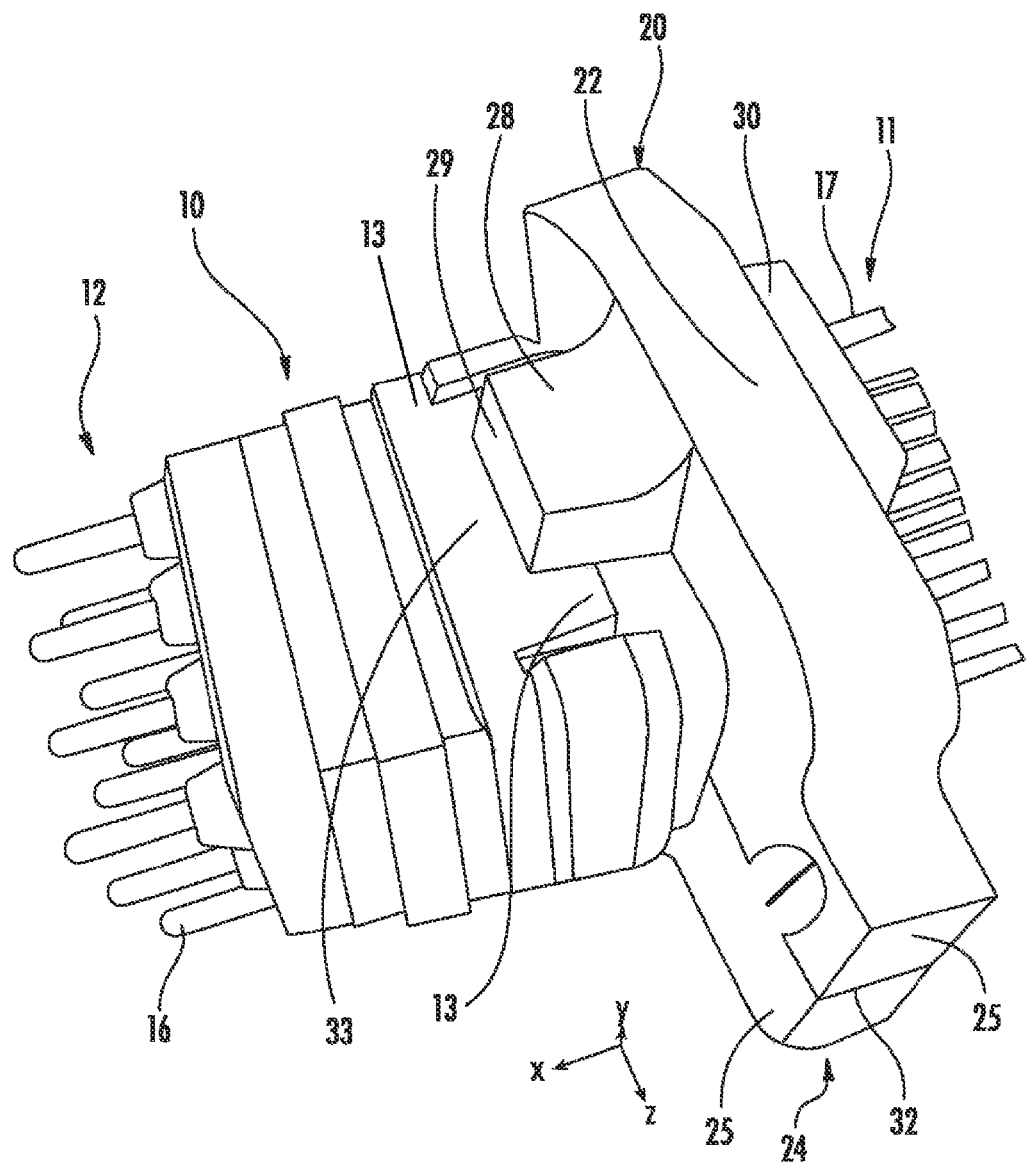
FIG. 7 is a perspective view of the insert from FIG. 3b seen in the viewing direction A with the adjustment member of FIG. 5 mounted thereon.

The pressure projections 28 are widened downwards in the x-direction by the pressure portions 29 and extended upwards by foot portions 30. Referring to FIG. 6 (and also FIG. 8a), the pressure projections 28 comprising the pressure portions 29 are received in the recesses 9. The width of the pressure projections 28 in the z-direction is selected so as to correspond to the width of the recesses 9, the pressure projections 28 being freely movable in the recesses 9 in the y-direction. The adjustment member 20 rests on the collar 7 of the housing 3 and surrounds the lower portion (shown at the top in this case) of the insert 10 in the manner of a clamp. The pressure portions 29 of the pressure projections 28 are in contact with the contact portions 15 of the latching projection 13 of the insert 10. This is shown in FIG. 7.

The connection means 5 is a releasable connection means 5. This means that it can be adjusted between a locked position, in which the insert 10 and the housing 3 are locked to one another, and an unlocked position, in which the insert 10 and the housing 3 are not locked to one another. The adjustment member 20 is adjustable between an inoperative position, in which the adjustment member 20 is not operatively connected to the connection means 5, and a release position, in which the adjustment member 20 is operatively connected to the connection means 5 for releasing the locked position into the unlocked position of the connection means 5. The adjustment member 20 is operatively connected to the connection means 5, i.e. to the contact portions of the latching projections 13, via the pressure portions 29 of the pressure projections 28.

In FIG. 6 the locking means 24 is arranged rotated through 180° in comparison to FIG. 5. The inoperative position of the adjustment member 20 is shown in FIG. 5 and FIG. 6. The actuation portions 25 are spaced apart by the gap 32. The release position of the adjustment member 20 is achieved in that the actuation portions 25 are pressed towards one another in the y-direction, which closes the gap 32, as shown in FIG. 7. This actuation can be effected for example using a conventional tool, for example a pair of pliers. The pressure projections 28 comprising the pressure portions 29 move towards one another in the y-direction, since the transition portions 23 of the side portions 22 have a particular resilient spring action. Through this movement of the pressure projections 28, the latching projections 13 of the insert 10 move in the y-direction in such a way that the holding portions 14 of the latching projections 13 come out of engagement with the latching portions 8 of the housing 8. The connection means 5 is then released, i.e. the insert 10 and the housing 3 can be released from one another again in the x-direction. This is described in greater detail below. If the actuation portions 25 are released again, the resilient action of the transition portions 23 of the clamp-like adjustment member 20 causes the gap 32 to open again, the pressure projections 28 moving back into the inoperative position (FIG. 5) and the latching projections 13 projecting outwards from the insert 10 again, ready for a new latching process.

In this example, the adjustment member 20 comprises the locking means 24. When the actuation portions 25 are actuated to close the gap 32, the engagement members 26 are pressed into the engagement seat 27 in the y-direction, are pressed towards one another in the z-direction and lock or clamp together. The adjustment member 20 remains in this release position until the locking means 24 is opened again. This can also be effected using a conventional tool, for example using a screwdriver, by pushing said tool between the actuation portions 25 and into the closed gap 32 (which can comprise entry bevels for this purpose) and thus releasing the locking means 24 with its clamping action. The adjustment member 20 then adopts the inoperative position again, as described above.

FIG. 8a is a schematic side view of the plug/socket arrangement 2 according to the invention, FIG. 8b is a schematic sectional view along the line B-B according to FIG. 8a and FIG. 8c is an enlarged view of region C from FIG. 8b.

It is clear from FIG. 8a that the pressure projections 28 of the adjustment member 20 are received in the recesses 9 of the housing 3, with the adjustment member 20 resting on the collar 7 of the housing 3. It is also clear that the foot portions 30 of the adjustment member 20 extend in the x-direction parallel to the terminal members 16 of the terminal side 11 of the insert 10. The foot portions 30 can therefore simultaneously perform a spacer function for the plug connector 2 in the case of assembly on a circuit board. Additional spacers can be omitted. The adjustment member 20 is thus arranged around the lower portion of the insert 10, between the underside of the housing 3 of the plug/socket arrangement 2 and a circuit board or mounting plate or the like.

Figure 8D:
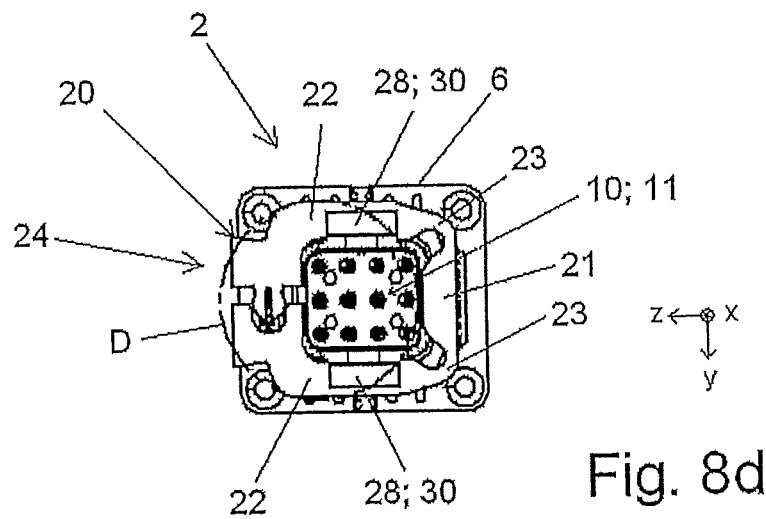
Figure 8E:
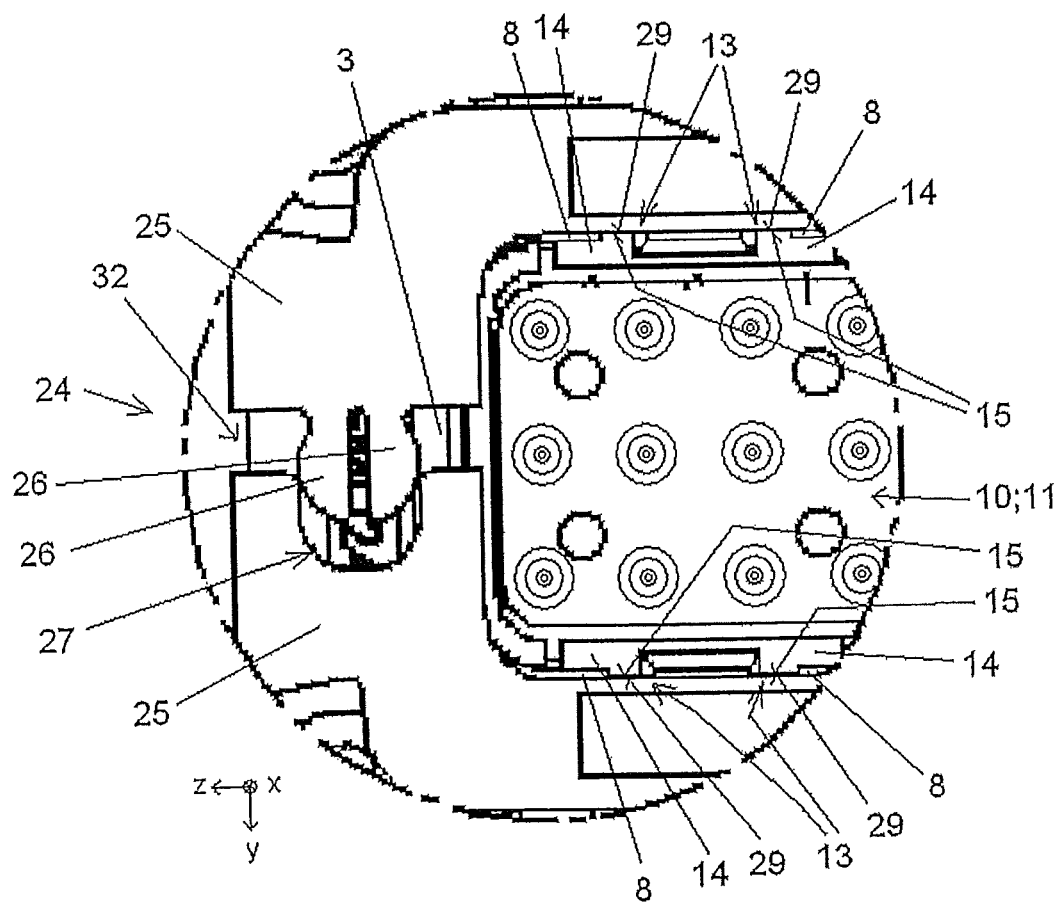
FIG. 8e is an enlarged view of region D from FIG. 8d.

It can be seen in the enlarged view shown in FIG. 8c that the pressure portion 29 of the pressure projection 28 contacts the contact portion 15 of the latching projections 13 of the insert 10. In this case, the holding portion 14 is located below the latching portion 8 of the housing 3. In the release position of the adjustment member 20, the pressure projection 28 (as can easily be imagined) is pushed to the right in the y-direction and onto the insert 10. The pressure projection 28 presses, via the pressure portion 29 thereof, the latching projection 13, via the contact portion 15 thereof, inwards and out of engagement with the latching portion 8, in such a way that the holding portion 14 of the latching projection 13 comes out of engagement with the latching portion 8 and a connection between the insert 10 and the housing 3 is released. The insert 10 and the housing 3 are then freely movable relative to one another in the longitudinal direction (x-direction) again. Finally, FIG. 8d is a schematic plan view of the underside of the plug/socket arrangement 2 according to the invention of FIG. 8a, and FIG. 8e is an enlarged view of region D from FIG. 8d.

The adjustment member 20 lies with its locking means 24 within a mounting surface of the plug/socket arrangement 2 and thus requires no additional construction surface, for example of a circuit board. It can be arranged in such a way that the actuation portions 25 are accessible from the left or from the right.

Using the locking means 24, it is possible for the adjustment member 20 also to remain in the release position without the actuation portions 25 being actuated by a tool.

The connection means 5 is activated when the latching projections 13 of the insert 10 project outwards and are freely resilient in the y-direction, i.e. latching is possible when the insert 10 is pushed into the housing 3. The connection means 5 is released when the latching projections 13 of the insert 10 are pressed inwards, i.e. in the y-direction towards the body of the insert 10, by the pressure projections 28 of the adjustment member 10. In this release position of the connection means 5, the holding portions 14 of the latching projections 13 are not engaged with the latching portions 8 of the housing 3 and the housing 3 can be removed from the insert 10 or the insert 10 can be pulled out of the housing 3.

Figure 9:
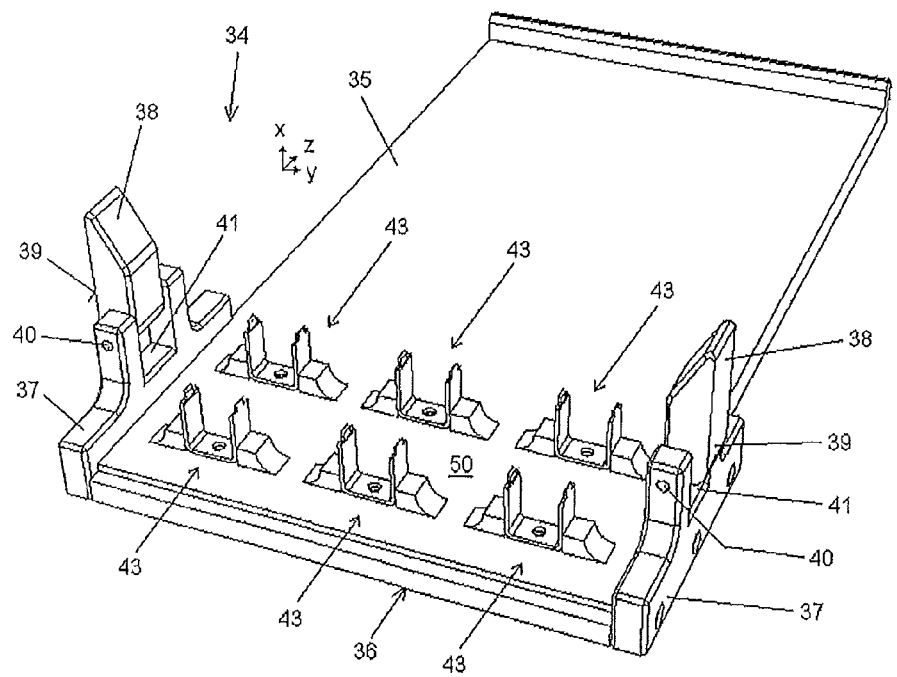
FIG. 9 is a perspective view of an embodiment of an unlocking tool.

FIG. 9 is a perspective view of an embodiment of an unlocking tool 34.

The unlocking tool 34 comprises a base plate 35 comprising at least one unlocking bracket 43. In this case, six unlocking brackets 43 are provided in a bracket region 50, beneath which a holding frame 36 is located. Each of the two sides of the holding frame 36 is provided with a lever holder 37, on which a lever 38 is pivotally mounted in a lever axis 40 on two upright supports. A seat 41 is formed between the lower end of the lever 38 and the holding frame 36, into which seat a pressure bar 43, which will be described in further detail below in connection with FIG. 15, can be inserted. The upper ends of the levers 38 are provided with a bevel in order to facilitate actuation.

Figure 10:
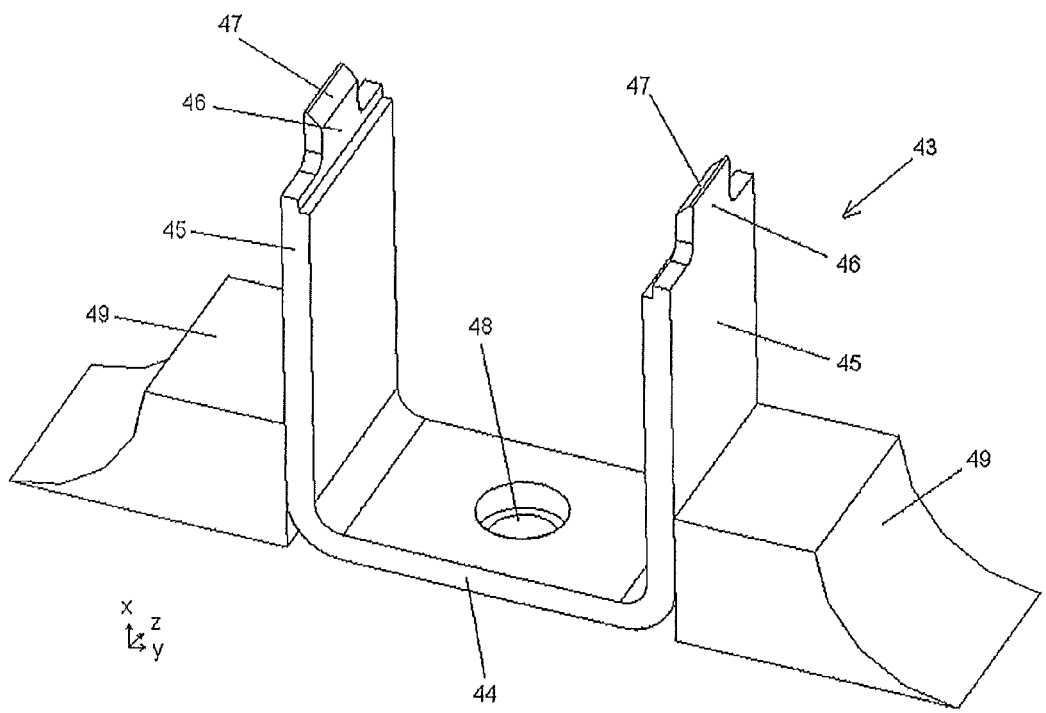
FIG. 10 is a perspective view of an unlocking bracket.

An unlocking bracket 43 is shown in a perspective view in FIG. 10. It consists of a planar material bent into a U-shape which comprises a mounting plate 44 comprising a fastening opening 48. On the two narrow sides of the mounting plate 44, legs 45 are bent upwards through 90° in the x-direction and are each formed at the upper ends thereof into a projection 46 having an oblique projection portion 47. The width of the projection 46 is approximately half the width of the leg 45 in the y-direction. The projection portions 47 face one another. A support 49 is mounted on the lower region of each leg 45 The unlocking bracket 43 can be formed together with the supports, for example in one piece, for example as a plastics material part, or in a plurality of parts. The fastening opening 48 is used for fastening the unlocking bracket 43 to the base plate 35 of the unlocking tool 34. A plurality of fastening openings 48 may be provided. Fastening means may be, for example, screws, bolts, rivets or the like.

Figure 11:
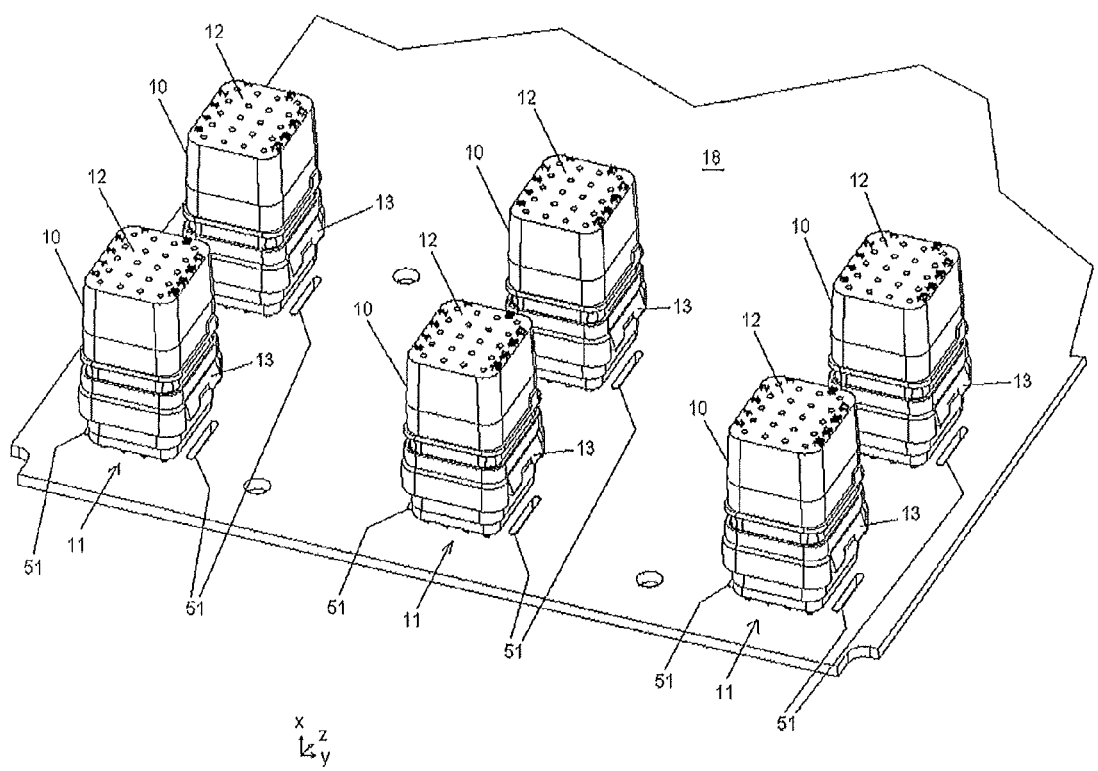
FIG. 11 is a perspective view of a circuit board comprising inserts of the plug/socket arrangement according to the invention.

The legs 45 comprising the projections 46 are provided for unlocking the insert 10 from the housings 3 by actuating the latching projections 13 by means of the projections 46. The inserts 10 are mounted on the circuit board 18, which is provided with apertures 51 for guiding through each of the legs 45. FIG. 11 shows this in a perspective view of a circuit board 18 with the inserts 10 of the plug/socket arrangement 2 according to the invention. The apertures 51 are produced as slots which correspond to the cross-sections of the legs 45 and are arranged adjacent to the soldered connections of the inserts 10 beneath the latching projections 13.

Figure 12:
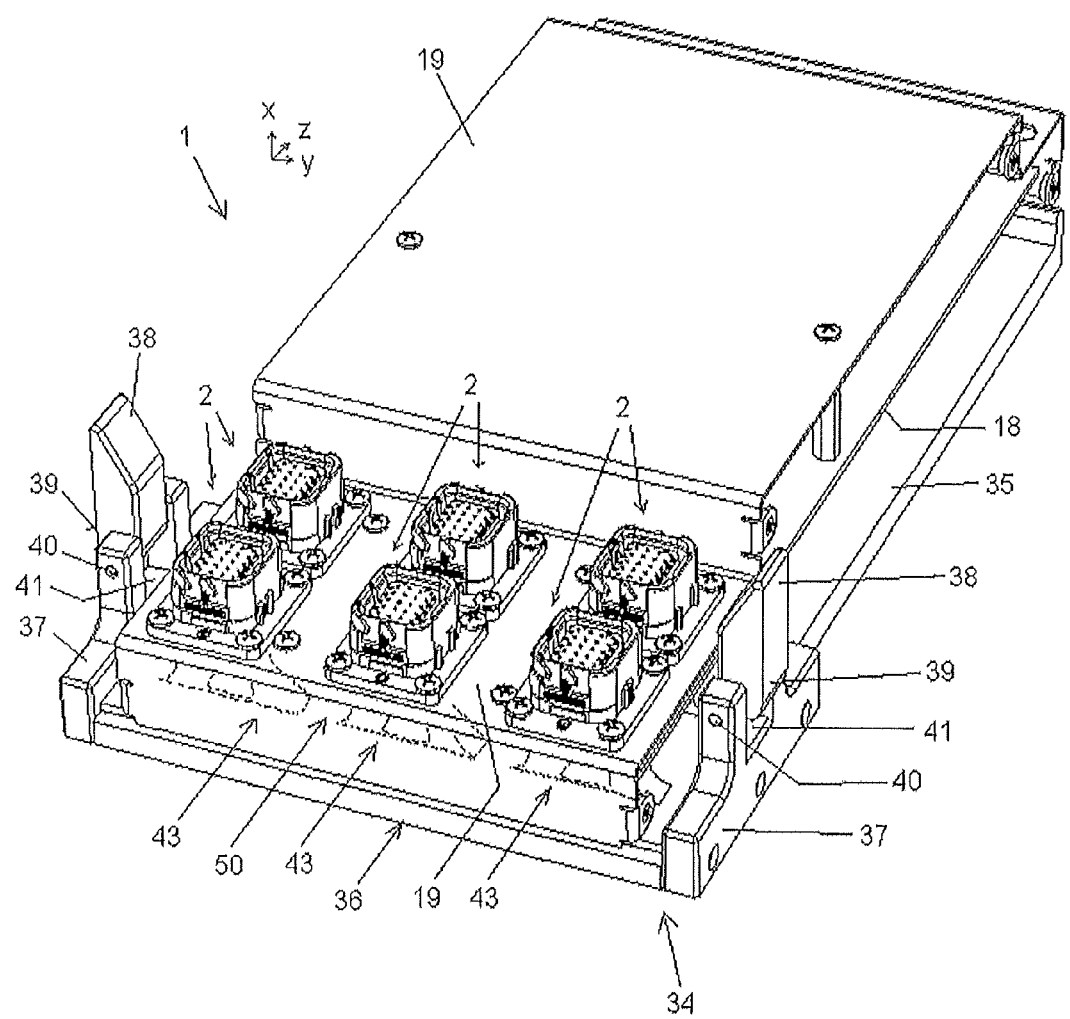
FIG. 12 is a perspective view of a device comprising the plug/socket arrangements according to the invention and the unlocking tool of FIG. 10.

The assembled device 1 comprising the circuit board 18 and the housings 3 latched onto the inserts 10 is mounted on the bracket region 50 of the unlocking tool 34 with the circuit board 18 in the region of the plug/socket arrangements 2, in such a way that all of the legs 45 of the unlocking brackets 43 can pass through the associated apertures of the circuit board 18. FIG. 12 shows this state as a perspective view of the device 1 comprising the plug/socket arrangements 2 according to the invention and the unlocking device 34 of FIG. 10. In this case, the unlocking brackets 43 are shown as a dotted line.

Figure 13:
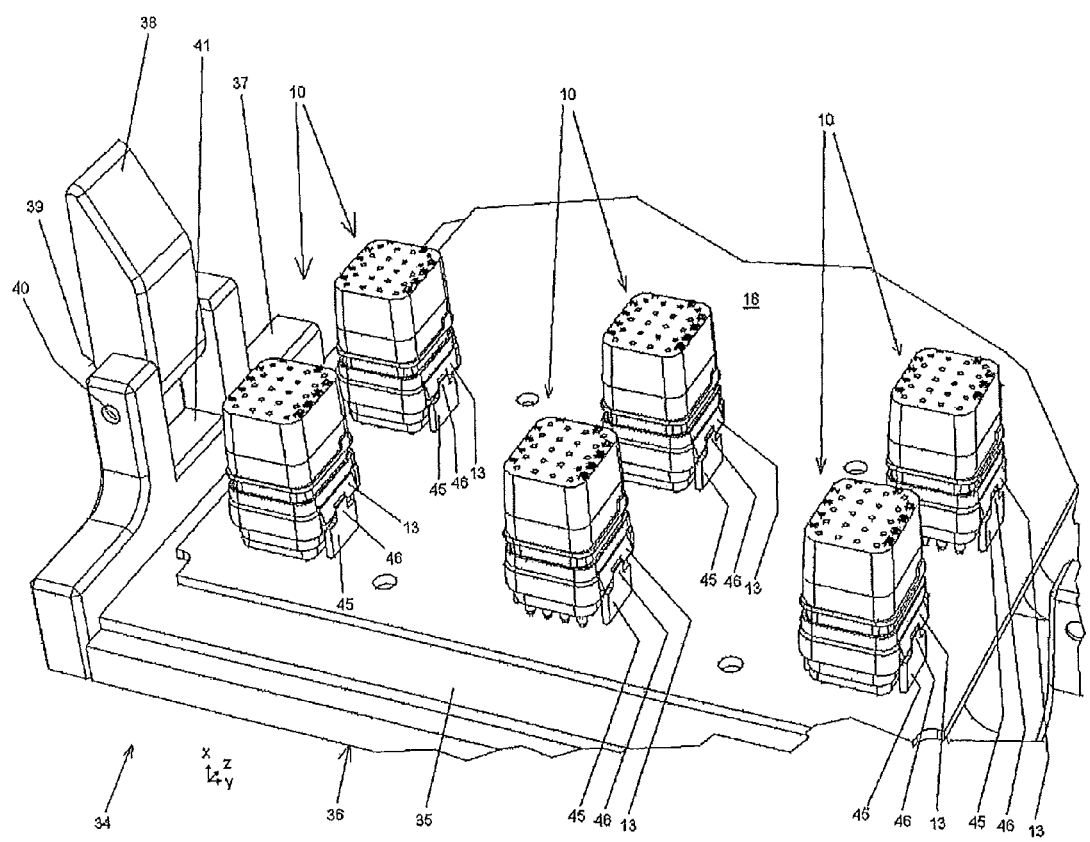
FIG. 13 is a perspective view of the circuit board of FIG. 11 without housings with the unlocking tool of FIG. 10.

To clarify the cooperation of the legs 45 with the projections 46 of the unlocking brackets 43, FIG. 13 shows the circuit board 18 without housings. The legs 45 are guided through the apertures 51 of the circuit board 18. The projection portions 47 of each of the projections 46 are not yet in contact with the associated latching projections 13 of the inserts 10. This means that the projection portions 47 can touch the latching projections 13 but do not exert any force on them.

Figure 14:
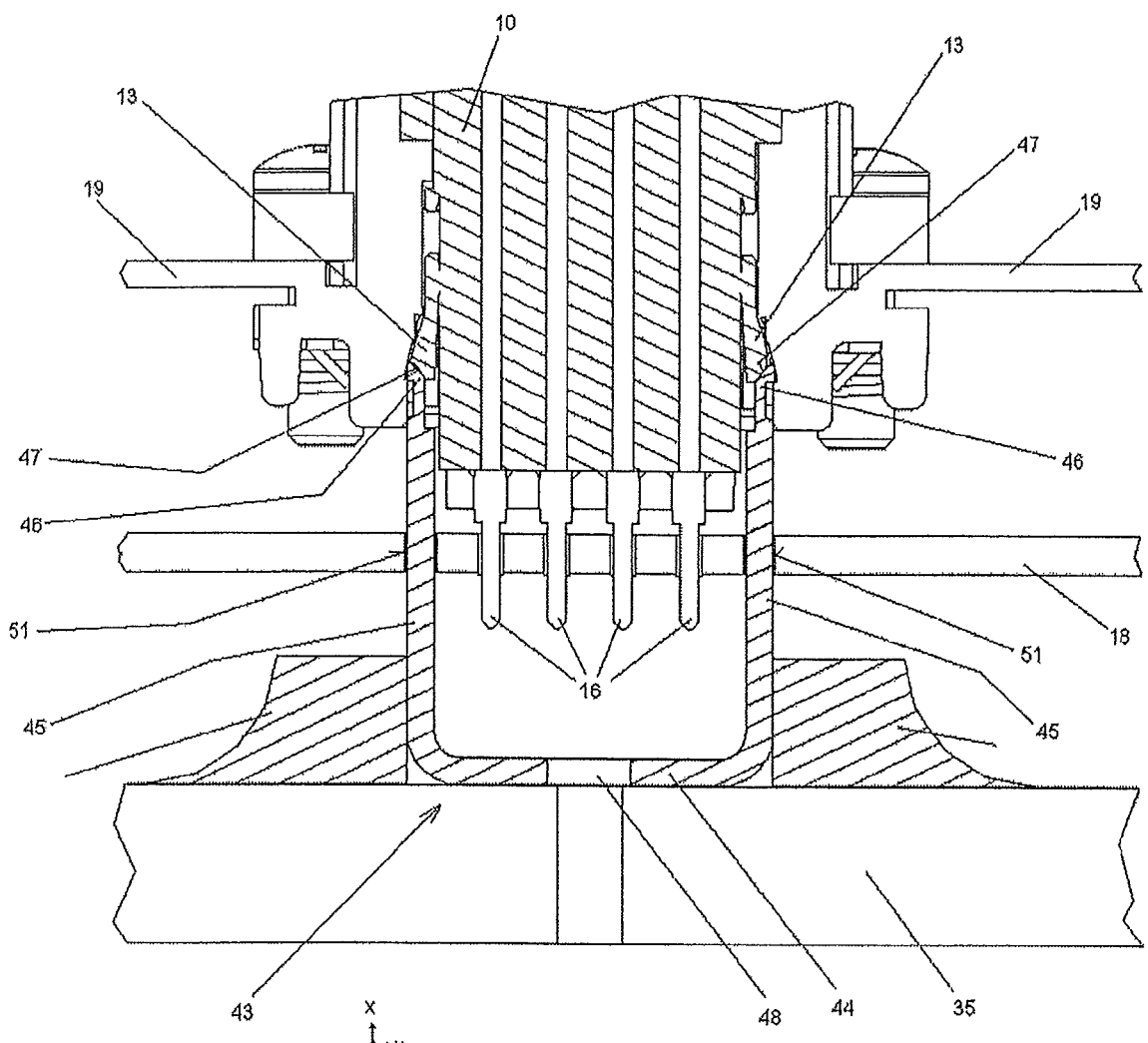
FIG. 14 is a sectional view along the line E-E of FIG. 12.
Figure 15:
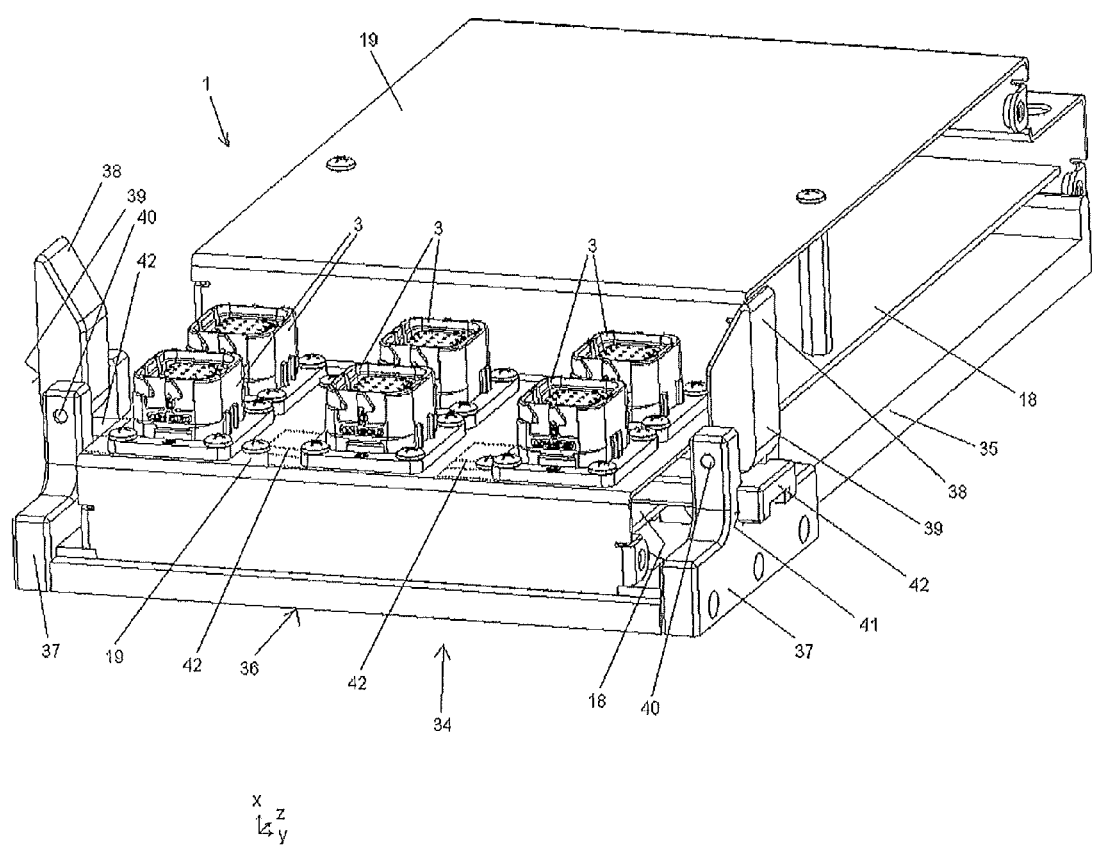
FIG. 15 shows the device of FIG. 12 with an inserted pressure bar prior to an unlocking operation.

FIGS. 13, 14 and 15 show the unlocking tool 34 in an inoperative position in which the unlocking brackets 43 are not operatively connected to the connection means 5.

For this purpose, FIG. 14 is a sectional view along the line E-E of FIG. 12. The bevels of the projection portions 47 face one another, the insert 10 being arranged between them. The way in which the legs 45 are guided through the apertures 51 of the circuit board 18 can clearly be seen.

Figure 16:
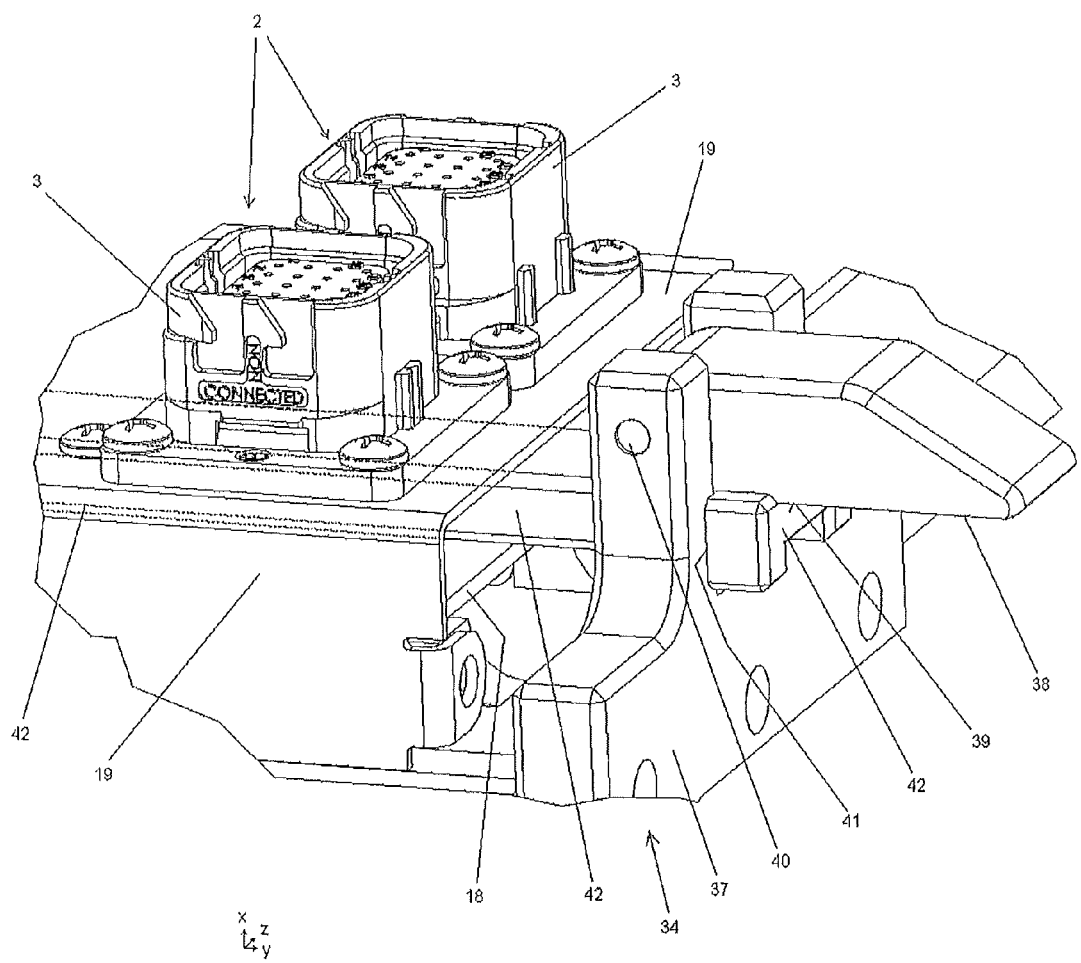
FIG. 16 is a perspective partial view from FIG. 15 with the inserted pressure bar when the unlocking tool is actuated.

Before an unlocking operation can take place, the pressure bar 42 is introduced through the seats 41 of the lever holders 37 in the y-direction in accordance with FIG. 15, which illustrates the device of FIG. 12 prior to an unlocking operation, the pressure bar 42 being positioned above the circuit board 18 beneath the wall portion 19. The pressure bar has a length which is greater than the width of the base plate 35 plus the width of the lever holder 37 in the y-direction. The two ends of the pressure bar 42 lie in the seats 41 beneath the lower ends of the levers 38. The levers 38 are now pivoted outwards about the pivot axis 40, lever pressure portions 39 of the lower outer sides of said levers pressing on the ends of the pressure bar 42. The circuit board 18 is pressed onto the unlocking brackets 43 in the x-direction. The projections 46 of the legs 44 press the latching projections 13 of the inserts 10 onto the insert 10 in each case, in such a way that the latching projections 13 are unlocked from the housings 3. This unlocked state is shown as a release position of the unlocking tool 34 in FIG. 16 in a perspective partial view from FIG. 15 with the inserted pressure bar 42 when the unlocking tool 34 is actuated, i.e. when the lever 38 is pivoted. In this case, the levers 38 are pivoted outwards through 90°. The housings 2 together with the wall portion 19 can now be removed from the inserts 10.

The number of unlocking brackets 43 corresponds to the number of inserts 10. The unlocking brackets 43 can be mountable on the base plate 35 for example using a quick fastening, in order to make rapid modification of the unlocking tool 34 possible.

A further configuration of the plug/socket arrangement 2 is characterised in that the adjustment member 20 comprises a base portion 21 and two side portions 22, the side portions 22 each being mounted by a first end on opposing ends of the base portion 21, at least one side portion 22 comprising the at least one pressure projection 28 having the at least one pressure portion 29, and one of the two actuation portions 25 being arranged on each of the second ends of the side portions.

A further configuration of the plug/socket arrangement 2 is characterised in that the two side portions 22 are connected to the base portion 21 via resilient transition portions 25.

A further configuration of the plug/socket arrangement 2 is characterised in that the housing 3 is provided with at least one recess 9 in which the at least one pressure projection 28 of the adjustment member 20 can be received.

A further configuration of the plug/socket arrangement 2 is characterised in that the adjustment member 20 is formed such that it can be locked in the release position by a locking means 24.

A further configuration of the plug/socket arrangement 2 is characterised in that the locking means 24 comprises a clamp mechanism which is integrated into the actuation portions 25.

A further configuration of the plug/socket arrangement 2 is characterised in that the adjustment member 20 comprises foot portions 30 as spacers.

A further configuration of the plug/socket arrangement 2 is characterised in that the connection means 5 comprises at least one latching portion 8 on the housing 3, which latching portion is provided for cooperation with at least one latching projection 13 on the insert 10.

And another configuration of the plug/socket arrangement 2 is characterised in that the at least one pressure projection 28 of the adjustment member 20 is provided with the at least one pressure portion 29 for contacting the at least one latching projection 13 of the connection means 5.

Although the present invention has presently been described with reference to preferred embodiments, it is not restricted thereto, but can be modified in many different ways.

For example, the base portion 21 of the adjustment member 20 can be rigidly fastened to the housing 3 or to the insert 10. The adjustment member can also be formed in one piece with the housing 3 or with the insert 10 by means of a corresponding injection method, the movable parts (side portions 22 and actuation portions 25) remaining freely movable.

It is also conceivable for the adjustment member 20 to be used as a circuit board assembly in another type of assembly, in particular in cases where there is limited construction space, such as a wall assembly.

The plug/socket arrangement 2 according to the invention can be used for a plug-in connection part that can be mounted on a circuit board and/or in a wall and for a part that can be attached to the end of a cable.

The unlocking tool 34 can also be used for unlocking an insert 10 from a housing 3 when the insert 10 is not mounted on a circuit board 18. For this purpose, the pressure bar 42 is then provided with a corresponding means for cooperation with the insert. For example, this means can press on the insert 10 from above from the connector side 12.

A plug/socket arrangement 2, in particular an electrical and/or optical plug/socket arrangement of an aircraft or spacecraft, comprises a housing 3 and at least one insert 10 which can be received in the housing 3. It further comprises a releasable connection means 5 which is adjustable between a locked position, in which the insert 10 and the housing 3 are locked to one another, and an unlocked position, in which the insert 10 and the housing 3 are not locked to one another; and an adjustment member 20, which is adjustable between an inoperative position, in which the adjustment member 20 is not operatively connected to the connection means 5, and a release position, in which the adjustment member 20 is operatively connected to the connection means 5 for releasing the locked position into the unlocked position of the connection means 5.

LIST OF REFERENCE NUMERALS 1 device
2 plug/socket arrangement
3 housing
4 opening
5 connection means
6 flange
7 collar
8 latching portion
9 recess
10 insert
11 terminal side
12 connector side
13 latching projection
14 holding portion
15 contact portion
16 terminal member
17 connector member
18 circuit board
19 wall portion
20 adjustment member
21 base portion
22 side portion
23 transition portion
24 locking means
25 actuation portion
26 engagement member
27 engagement seat
28 pressure projection
29 pressure portion
30 foot portion
31 latching seat
32 gap
33 latching projection portion
34 unlocking tool
35 base plate
36 holding frame
37 lever holder
38 eccentric lever
39 lever pressure portion
40 lever axis
41 seat
42 pressure bar
43 unlocking bracket
44 mounting plate
45 leg
46 projection
47 projection portion
48 fastening opening
49 support
50 bracket region
51 aperture
x, y, z coordinates

The invention claimed is:

1. A plug/socket arrangement, in particular of an electrical or optical plug connector of an aircraft or spacecraft, comprising:
   a housing;
   at least one insert which can be received in the housing;
   a releasable connection means which is adjustable between a locked position, in which the insert and the housing are locked to one another, and an unlocked position, in which the insert and the housing are not locked to one another; and
   an adjustment member which is adjustable between an inoperative position, in which the adjustment member is not operatively connected to the connection means, and a release position, in which the adjustment member is operatively connected to the connection means for releasing the locked position into the unlocked position of the connection means, wherein the adjustment member is formed as a clamp having at least one pressure projection comprising at least one pressure portion, the adjustment member comprising two actuation portions which are spaced apart by a gap when the adjustment member is in the inoperative position, the actuation portions resting against one another and the gap being closed when the adjustment member is in the release position.

2. The plug/socket arrangement according to claim 1, wherein
   the adjustment member can be mounted on a portion of the insert and/or a portion of the housing, the at least one pressure portion of the adjustment member being provided for cooperation with the connection means.

3. A plug/socket arrangement, in particular of an electrical or optical plug connector of an aircraft or spacecraft, comprising:
- a housing;
- at least one insert which can be received in the housing;
- a releasable connection means which is adjustable between a locked position, in which the insert and the housing are locked to one another, and an unlocked position, in which the insert and the housing are not locked to one another;
- a circuit board on which the insert is mounted; and
- an unlocking tool comprising at least one unlocking bracket which can be brought into contact with the connection means and which is adjustable between an inoperative position, in which the unlocking bracket is not operatively connected to the connection means, and a release position, in which the unlocking bracket is operatively connected to the connection means for releasing the locked position into the unlocked position of the connection means, wherein the unlocking tool comprises at least one base plate comprising the at least one unlocking bracket, a holding frame comprising at least two levers, and at least one pressure bar for cooperation with the levers and the at least one insert via the circuit board.

4. The plug/socket arrangement according to claim 3, wherein
the connection means comprises at least one latching portion on the housing, which latching portion is provided for cooperation with at least one latching projection on the insert.

5. The plug/socket arrangement according to claim 4, wherein
the at least one unlocking bracket comprises two legs each having at least one projection, each of the projections being integrally formed on the upper ends of the legs and being formed with opposing oblique projection portions.

6. The plug/socket arrangement according to claim 5, wherein
the at least one projection is provided for cooperation with the at least one latching projection of the insert in each case.

7. The plug/socket arrangement according to claim 3, wherein
the circuit board is provided with apertures for guiding through the legs of the at least one unlocking bracket.

8. An unlocking tool for a plug/socket arrangement according to claim 3.

* * * * *